H. V. LOUGH.
SECTIONAL MOLD AND LOCKING MEANS THEREFOR.
APPLICATION FILED SEPT. 23, 1918.

1,320,015.  Patented Oct. 28, 1919.

Inventor,
Hector V. Lough,
By his Attorney.

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

SECTIONAL MOLD AND LOCKING MEANS THEREFOR.

1,320,015.     Specification of Letters Patent.     Patented Oct. 28, 1919.

Application filed September 23, 1918. Serial No. 255,265.

*To all whom it may concern:*

Be it known that I, HECTOR V. LOUGH, a subject of the King of Great Britain, residing at Hartford, county of Hartford, and State of Connecticut, have invented certain new and useful Improvements in Sectional Molds and Locking Means Therefor, of which the following is a full, clear, and exact description.

This invention relates to sectional molds and locking means therefor.

Heretofore in the manufacture of rubber tires and other articles, it has been the practice to lock the sections of the vulcanizing mold together at a number of separate points by a plurality of independent bolts, clips or other suitable fastening means. This manner of securing the mold sections together necessitates the separate operation of each of the fastening devices in order to lock or unlock the mold sections, resulting in a considerable loss in time and labor.

The principal object of the present invention, accordingly, is to provide improved means enabling the mold sections to be efficiently locked and to be unlocked by a single operation.

A further object of the invention is to provide improved means whereby the mold sections may be locked by a single operation without the necessity of turning them to registering positions as has theretofore been required, where bolts or similar fasteners are used.

With these and other objects in view, which will hereinafter readily appear, the invention consists in the novel construction, combination and arrangement of parts hereinafter more fully described and claimed.

Figure 1:
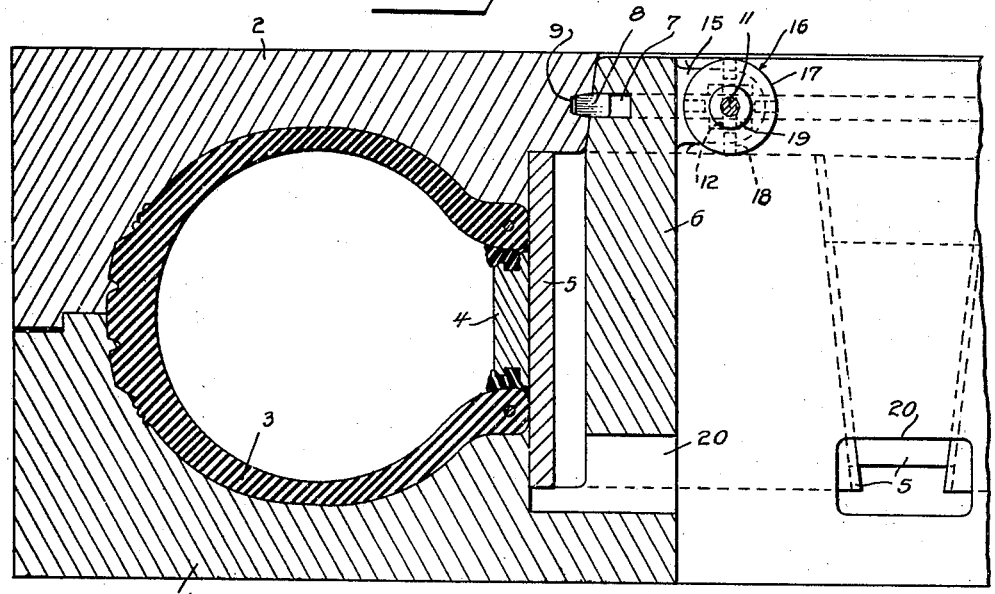
Figure 2:
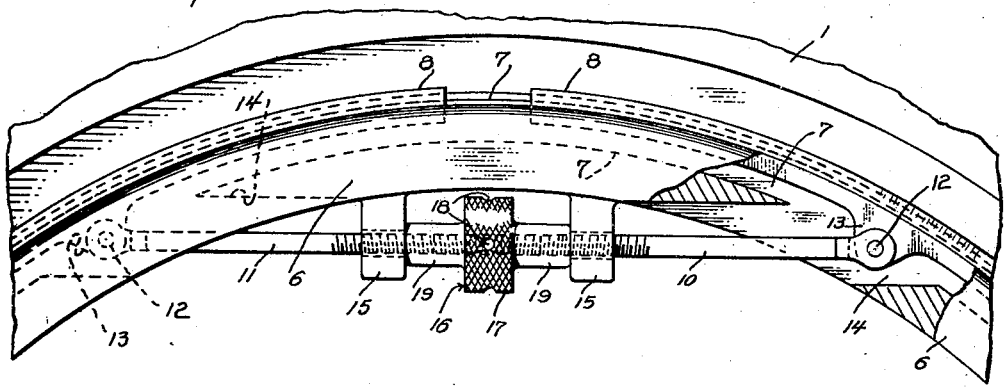

A practical embodiment of the invention is represented in the accompanying drawings forming a part of this specification in which similar characters of reference indicate corresponding parts in all the views;

Figure 1 is a cross-sectional view illustrating a tire mold embodying my invention; and Fig. 2 a fragmentary plan view of one of the mold sections shown in Fig. 1, portions being broken away to clearly illustrate certain of the details of the construction.

Referring to the drawings, the numerals 1 and 2 indicate annular companion sections of a tire mold, a pneumatic tire 3 being shown in place therein. The numeral 4 indicates a bull ring and the numeral 5 indicates a wedge ring, both rings being of the well known and usual type.

The mold section 1 is provided with a substantially vertical annular flange 6 formed on its outer periphery with a groove 7 adapted to receive an expansible split locking ring 8 of resilient metal, while the mold section 2 is provided on its inner periphery with a groove 9 arranged to register with the groove 7 of the mold section 1 when the parts are assembled. By reference to Fig. 1 of the drawings, it will be seen that the arrangement of the grooves permits the split ring 8 to be expanded to extend from the groove 7 into the groove 9, thus locking the sections against separation, and to be contracted from the groove 9 into the groove 7 to permit the sections to be separated for the removal of the tire.

For the purpose of expanding and contracting the split ring to lock and unlock the mold sections, a pair of rods 10 and 11 are provided. These rods are hingedly secured by bolts 12 to the ears 13 formed on the split ring adjacent its ends. They are arranged to extend through suitable slots 14 formed near the top of the flange 6, and through alined bores provided in the pair of supporting brackets 15 projecting from the inner periphery of the flange. The inner ends of the rods are oppositely threaded to engage an adjusting nut 16 disposed between the supporting brackets 15. The adjusting nut 16 is formed with an enlarged central circular portion 17 having recesses 18 for the insertion of a suitable turning tool. Extending from either side of the central enlarged portion 17 of the adjusting nut are trunnion-like projections 19 adapted to abut the opposed faces of the brackets to hold the nut centered, thus insuring uniform expansion of the locking ring. From the foregoing description, it will be obvious that by turning the adjusting nut, the rods may be moved outwardly or inwardly as desired to expand or contract the split ring so as to lock or unlock the mold sections.

In operating the lock after the mold sections have been assembled, the nut 16 is turned to expand the split ring into the groove 9 of the mold section 2, thus securely fastening the parts together. In order to unlock the sections, the nut is turned in an opposite direction to contract the split ring into the groove 7, thus enabling the sections to be separated.

For the purpose of removing the wedge ring to provide ample clearance to facilitate the removal of the tire, a plurality of slots 20 are provided near the bottom of the mold section 1 to enable a suitable prying tool to be inserted under the bottom of the ring.

The improved construction possesses the important advantage over the locking means heretofore employed in that the mold sections may be locked or unlocked by a single operation instead of by a plurality of operations at different points as has been previously required, thus effecting a substantial economy in time and labor. A further advantage of the construction effecting an important saving of time and labor is that the mold sections may be assembled and locked without the necessity of turning them to bring bolt holes, lugs or other parts into registering positions as has heretofore been required.

The flange 6 and its coöperative relation with respect to the annular section 2 are also noteworthy. This flange, which is beveled at its outer free edge, guides the annular section 2 as it is shifted laterally, and centers it in proper coöperative working relation with the other section 1.

Although the split locking ring has been described as mounted in the mold section 1, it is to be understood that it may be applied to the section 2 with equally efficient results, in which case the ring would be contracted to engage a suitable groove in the mold section 1 to lock the parts.

If desired the locking ring may be formed with a plurality of fingers or lugs adapted to extend into suitable recesses to lock the sections together when the split ring is expanded or contracted. It is further within the contemplation of the invention to employ any suitable means instead of the nut and rods shown, to expand and contract the locking ring.

While some of the preferred embodiments of the invention have been set forth, it is to be understood that various modifications in construction, combination and arrangement of the parts may be resorted to without sacrificing any of the advantages or departing from the spirit of the invention defined in the appended claims.

Having thus described my invention what I claim and desire to protect by Letters Patent is:—

1. In an apparatus of the character described, the combination of a plurality of article engaging and complementary mold sections two of which have grooves oppositely disposed when the sections are assembled, and an adjustable ring adapted to be moved from a position wholly within one of the opposed grooves partly into the other to interlock the sections against relative displacement.

2. In an apparatus of the character described, the combination of a plurality of companion mold sections having oppositely disposed grooves adapted to define an article receiving cavity when the sections are assembled, and a split ring adapted to be forced from one of the opposed grooves into locking engagement with the other to mutually hold the sections against separation.

3. In an apparatus of the character described, the combination of a plurality of mold sections having grooves oppositely disposed when the sections are assembled, a split ring, a pair of rods hingedly secured to said ring, and a nut threadedly engaging said rods and adapted when turned in one direction to cause the expansion of said ring and when turned in another direction to cause the contraction thereof.

4. In an apparatus of the character described, the combination of a plurality of mold sections having grooves oppositely disposed when the sections are assembled, a split ring, a pair of rods hingedly secured to said ring, a nut threadedly engaging said rods and adapted when turned in one direction to cause the expansion of said ring and when turned in another direction to cause the contraction thereof, and a pair of brackets for centering said nut.

5. In apparatus of the class described, in combination, a pair of annular mold sections provided with opposed and complementary curved faces defining an article receiving cavity, one of said sections having a guiding flange adapted to locate the sections in coöperative working relation, said flange and other section having opposed grooves, and an adjustable interlocking element shiftable from a position wholly within one of said grooves part way into the other so as to interlock the sections against relative displacement.

6. In apparatus of the class described, in combination, mating annular mold sections shiftable laterally into and out of coöperating working relation and provided with complementary matrices defining an article receiving cavity, means on one of said sections for centering the other therewith, each of said sections being provided with opposed grooves registering when the sections are in coöperative working relation, a split ring, and an adjustable link for flexing said split ring from a position permitting to a position preventing relative shifting of the annular sections.

Signed at Hartford, county of Hartford, and State of Connecticut, this 17th day of September, 1918.

HECTOR V. LOUGH.